United States Patent
Hu

(10) Patent No.: US 11,532,404 B2
(45) Date of Patent: Dec. 20, 2022

(54) TRAVELLING WAVE REACTOR FOR SPACE EXPLORATION

(71) Applicant: Shanghai Jiao Tong University, Shanghai (CN)

(72) Inventor: Po Hu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 17/630,507

(22) PCT Filed: Jun. 7, 2021

(86) PCT No.: PCT/CN2021/098569
§ 371 (c)(1),
(2) Date: Jan. 27, 2022

(87) PCT Pub. No.: WO2021/259050
PCT Pub. Date: Dec. 30, 2021

(65) Prior Publication Data
US 2022/0246316 A1     Aug. 4, 2022

(30) Foreign Application Priority Data

Jun. 23, 2020   (CN) .......................... 202010578765.9

(51) Int. Cl.
*G21C 1/02* (2006.01)
*G21C 15/257* (2006.01)
*G21C 15/18* (2006.01)

(52) U.S. Cl.
CPC ........... *G21C 1/026* (2013.01); *G21C 15/257* (2013.01); *G21C 15/18* (2013.01)

(58) Field of Classification Search
CPC ...... G21C 1/026; G21C 1/022; G21C 15/257; G21C 7/06; G21C 15/18

(Continued)

(56) References Cited

U.S. PATENT DOCUMENTS

2010/0040187 A1\* 2/2010 Ahlfeld ................. G21C 1/026
                                                              376/367
2020/0194132 A1     6/2020 Mitsuyasu

FOREIGN PATENT DOCUMENTS

CN          103299374          9/2013
CN          104021826          9/2014
(Continued)

OTHER PUBLICATIONS

"International Search Report (Form PCT/ISA/210) of PCT/CN2021/098569," dated Aug. 30, 2021, with English translation thereof, pp. 1-6.

*Primary Examiner* — Jack W Keith
*Assistant Examiner* — Daniel Wasil
(74) *Attorney, Agent, or Firm* — JCIPRNET

(57) ABSTRACT

A travelling wave reactor for a space exploration. A reactor core of the travelling wave reactor is dispersed into several modules in a travelling wave direction; a new reactor is sequentially provided with a starting source module and a plurality of new fuel modules at zero burnup; all the modules are coaxially assembled in the travelling wave direction by means of an assembling parts, and each module further includes a heat pipe; the heat pipe in each module positioned at a front part sequentially passes through all the modules positioned at a rear portion thereof and extends out of the module at a rear end; and after a period of time of burn-up, the reactor core of the travelling wave reactor is provided with the starting source module, a spent fuel module, a critical fuel module and the new fuel module sequentially in the travelling wave direction.

10 Claims, 3 Drawing Sheets

(58) Field of Classification Search
USPC .................................................. 376/212, 367
See application file for complete search history.

(56) References Cited

FOREIGN PATENT DOCUMENTS

| CN | 105427898 | 3/2016 |
|----|-----------|--------|
| CN | 107785087 | 3/2018 |
| CN | 108766591 | 11/2018 |
| CN | 110415837 | 11/2019 |
| CN | 110945600 | 3/2020 |
| CN | 111739666 | 10/2020 |

* cited by examiner

TRAVELLING WAVE REACTOR FOR SPACE EXPLORATION

CROSS-REFERENCE TO RELATED APPLICATION

This application is a 371 of international application of PCT application serial no. PCT/CN2021/098569, filed on Jun. 7, 2021, which claims the priority benefit of China application no. 202010578765.9, filed on Jun. 23, 2020. The entirety of each of the above mentioned patent applications is hereby incorporated by reference herein and made a part of this specification.

FIELD OF TECHNOLOGY

The present invention relates to the technical field of nuclear power, in particular to a travelling wave reactor for a space exploration.

BACKGROUND

A travelling wave (fast) reactor is a fast neutron reactor which uses fast neutrons to carry out a chain fission reaction and provide energy. The reactor uses an open fuel cycle strategy, and fuel recycle processing is not needed, and natural uranium or spent fuel of a thermal reactor can be directly used as fuel, and the burning of reactor can persist to a sufficient burn-up depth by one-time loading, such that shutdown for refueling is avoided during a service life.

Taking a uranium-plutonium cycle as an example, the basic principle is as follows: a reactor core is divided, in an axial direction (a travelling wave direction), into an ignition region in a small part and a subcritical region (natural uranium or spent fuel of a thermal reactor) in a large part. When the reactor is started up, the ignition region "ignites" and reaches criticality at first, generated fast neutrons will convert $^{238}$U in the nearby subcritical region into $^{239}$Pu, and then converted $^{239}$Pu enables a nearby region to reach the criticality, thus forming a "breed-and-burn wave". The wave continuously enables natural uranium or spent fuel in front of the wave to generate a breeding reaction, and then a "burn-up" (critical fission) reaction phase is started. In the propagation direction of the wave, local reactivity rises to supercriticality first and then falls to subcriticality, and a critical wave slowly passes through the whole reactor core in the axial direction during the service life of the reactor core. In this process, the travelling wave reactor enters a self-sustaining stage after ignition and start-up, and residual reactivity of the whole reactor remains unchanged in an ideal state during burn-up, so corresponding reactivity control is not needed. Theoretically speaking, for a self-sustaining travelling wave fast reactor with arbitrarily long service life, only the fuel reserve in the travelling wave direction of the reactor core needs to be increased.

Nowadays, research on travelling wave reactors is limited to reactor types used on land, and as deep space exploration advances constantly, a travelling wave reactor for a deep space exploration needs to be designed.

SUMMARY

The objective of the present invention is to overcome the above drawbacks of the prior art and provide a travelling wave reactor for a space exploration. The travelling wave reactor can meet power requirements of the space exploration, and meanwhile avoid a load pressure of an overweight travelling wave reactor on a spacecraft.

The objective of the present invention can be realized by the following technical solution:

The core of the travelling wave reactor for a space exploration is divided into several modules in the wave propagating direction; a new reactor consists of a starting source module and a plurality of fresh fuel modules sequentially at zero burnup state; all the modules are coaxially assembled in the travelling wave direction using assembling parts, and each module further includes a heat pipe; and during assembly, the heat pipe in each module positioned at a front part sequentially passes through all the modules positioned at a rear portion thereof and extends out of the module at a rear end.

The starting source module is used for emitting neutron flow to enable the fresh fuel module nearby to generate a nuclear critical reaction, and the new fuel module enables the nuclear critical reaction to continue to form a critical travelling wave.

After a period of time of burn-up, the reactor core of the travelling wave reactor sequentially consists of the starting source module, a spent fuel module, a critical fuel module and the new fuel module in the travelling wave direction.

The spent fuel module is generated after the new fuel module is subjected to the critical nuclear reaction, and a certain amount of fissile nuclide is generated after the new fuel module experiences a sufficient amount of nuclear conversion reactions, so as to enter the nuclear criticality state, and in the state, the number of neutrons released in the critical fuel module by means of the nuclear fission reaction exceeds the number of neutrons absorbed thereby, so as to promote nuclear conversion in the new fuel module on one side.

Preferably, all the modules in the travelling wave reactor are assembled in space after being transported from a land to the space.

Preferably, the starting source module includes a starting source inner layer and a starting source outer layer in a radial direction, the starting source inner layer being provided with a neutron source material, and the starting source outer layer being a neutron shielding layer.

Preferably, the new fuel module includes a new fuel inner layer and a new fuel outer layer in a radial direction, the new fuel inner layer being filled with a convertible material, and the new fuel outer layer being a neutron shielding layer.

Preferably, uniform sections of all the modules in the travelling wave reactor are in butt joint.

Preferably, the assembling parts includes a fastening hasp and a fastening bolt which are arranged on edge sides of two end portions of each module, and each two adjacent modules are detachably assembled by means of the fastening hasp and the fastening bolt.

Preferably, each module in the travelling wave reactor further includes a butt joint positioning member for coaxial butt joint during assembly.

Preferably, the butt joint positioning member includes a bump and a groove which are coaxially arranged at two ends of each module, and during assembly, the bump and the groove on each two adjacent modules match each other.

Preferably, when the travelling wave reactor is used as a power source for the space exploration, a specific application mode is as follows:

firstly, a set number of starting source module and new fuel modules of the travelling wave reactor are launched to a preset position in space.

Then, the new fuel modules are sequentially and axially connected by means of the assembling parts to form a new fuel module group.

Finally, the starting source module is mounted at a head end of the new fuel module group by means of the assembling parts, and the heat pipes extending out of an end portion is connected to a thermoelectric conversion device, then start the travelling wave reactor to burn.

Preferably, when the travelling wave reactor operates, spent fuel is continuously accumulated at a rear portion of the travelling wave direction to form the spent fuel module, and on the premise of ensuring a criticality of the reactor core by nuclear physics calculation, the starting source module and part of the spent fuel modules are separated from the travelling wave reactor and discarded.

Compared with the prior art, the present invention has the following advantages:

(1) According to the present invention, reactor core materials of the travelling wave reactor are designed in a modularized manner, and a length of the reactor core in a travelling wave transmission direction may be changed as required like building blocks such that travelling wave reactors with corresponding lengths may be provided according to features and lengths of space missions, so as to meet the power requirements of the space exploration and meanwhile avoid the load pressure brought by the overweight travelling wave reactor to the spacecraft.

(2) The reactor core materials of the present invention are launched in a modularized manner, and assembled in the space, so as to reduce requirements of launching power.

(3) According to the present invention, with regard to a specific mission of the space exploration, since after a period of time of operation, spent fuel is continuously accumulated at the rear portion of the travelling wave direction of the travelling wave reactor, on the premise of ensuring the criticality of the reactor core, the starting source module and part of the spent fuel modules may be directly discarded as "deadweights" such that on one hand, a load of the spacecraft may be reduced, and on the other hand, a one-time propulsion may be obtained during discarding, so as to improve power efficiency of the space exploration.

DESCRIPTION OF THE EMBODIMENTS

The present invention is described in detail below with reference to the accompanying drawings and specific embodiments. It should be noted that the following description of the implementations is merely illustrative in nature, and the present invention is not intended to be limited to its application objects or use, and the present invention is not limited to the following implementations.

Embodiment 1

Figure 1:
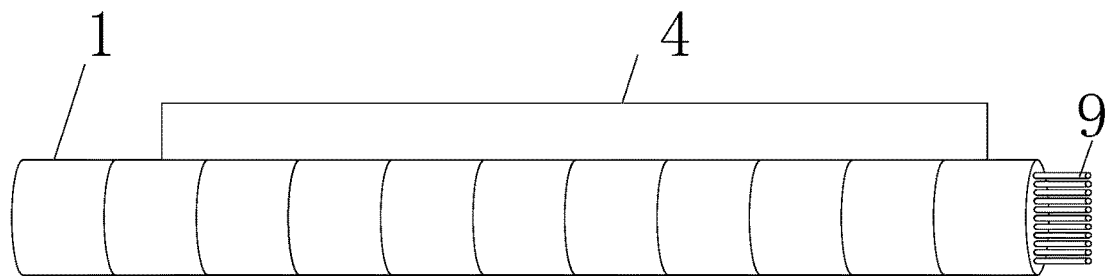
FIG. 1 is a schematic diagram of a structure without burn-up of a travelling wave reactor for a space exploration in Embodiment 1.

As shown in FIG. 1, a reactor core of a travelling wave reactor for a space exploration is dispersed into several modules in a travelling wave direction; a new reactor is sequentially provided with a starting source module 1 and a plurality of new fuel modules 4 at zero burnup. All the modules are coaxially assembled in the travelling wave direction by means of assembling parts. Uniform sections of all the modules in the travelling wave reactor are in butt joint. Each module further includes a heat pipe 9 for conducting out heat. During assembly, the heat pipe 9 in each module positioned at a front part sequentially passes through all the modules positioned at a rear portion thereof and extends out of the module at a rear end. The heat pipe 9 is a closed metal tube containing a liquid heat conducting substance, these pipes come out of the reactor, and the other end thereof is inserted into a thermoelectric conversion device to supply power to a spacecraft. All the modules in the whole travelling wave reactor are assembled in space after being transported from a land to the space, and the heat pipe 9 has an extraction function, that is, when the module at the front part is separated from the hot reactor, the heat pipe 9 thereon is extracted from all the modules at the rear portion.

The starting source module 1 is used for emitting neutron flow to enable the new fuel module 4 nearby to absorb neutrons to cause nuclear conversion reaction, so as to accumulate fissile nuclides to cause nuclear critical reaction. The new fuel module 4 contains a large amount of materials capable of generating fissile nuclides by means of the nuclear conversion reaction, such that the nuclear critical reaction may continue to form a critical travelling wave. In the embodiment, one starting source module 1 is arranged, and ten new fuel modules 4 are arranged.

Figure 2:
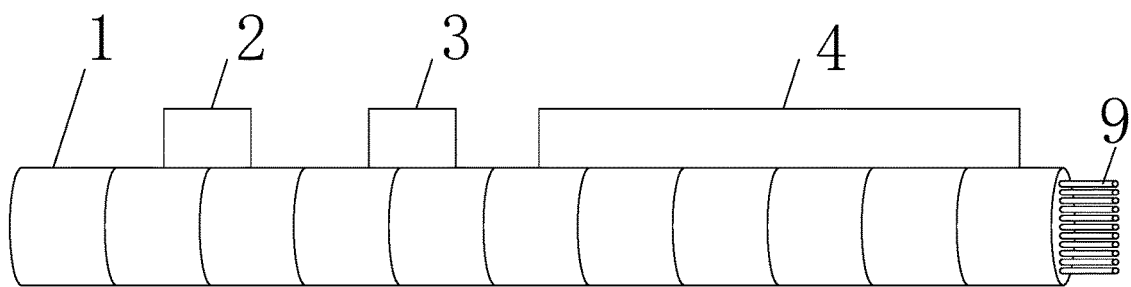
FIG. 2 is a schematic diagram of a structure after a period of time of burn-up of the travelling wave reactor for a space exploration in Embodiment 1.

After a period of time of burning, spent fuel is generated, and meanwhile, a fuel module in nuclear criticality is also generated. Therefore, as described in FIG. 2, after a period of time of burn-up, the reactor core of the travelling wave reactor is provided with the starting source module 1, a spent fuel module 2, a critical fuel module 3 and the new fuel module 4 sequentially in the travelling wave direction, that is, the spent fuel module 2 and the critical fuel module 3 are generated after burning. The spent fuel module 2 is generated after the new fuel module 4 is subjected to the critical nuclear reaction, a certain amount of fissile nuclide is generated after nuclides in new fuel absorbing external neutrons to cause a sufficient amount of nuclear conversion reactions, so as to enter the nuclear criticality state, and in the state, the number of neutrons released by the critical fuel module 3 by means of the nuclear fission reaction exceeds then number of neutrons absorbed thereby, so as to promote nuclear conversion in new fuel on one side. In FIG. 2, after the travelling wave reactor in the embodiment is burned for a period of, two spent fuel modules 2 and two critical fuel modules 3 are generated, and six new fuel modules 4 are remained.

The starting source module 1, the new fuel module 4, etc. may be set as cylindrical structures, and mainly include common neutron source materials such as Cf or Po—Be coated with stainless steel materials. The new fuel module 4 is mainly composed of a convertible material such as U238 coated with stainless steel. The starting source module 1 and the new fuel module 4 may each be divided into an inner layer and an outer layer in a radial direction. The inner layers are filled with the above effective materials (the inner layer of the starting source module 1 is filled with the neutron source material, and the inner layer of the new fuel module 4 is filled with the convertible material). The outer layer of each module is a neutron shielding layer, such that the neutron flow is mainly transmitted in the axial direction. When a new reactor is started, one side of an outer layer in a radial direction and an outermost end in an axial direction of the starting source are covered with neutron reflecting layers, so as to guide the neutron flow to be injected into the new fuel module 4 in the axial direction. A large number of nuclides in the adjacent new fuel module 4 are continuously converted into fissile nuclides, so as to enter nuclear criticality state, nuclear fission reactions is generated to release a large number of neutrons, so as to continue to convert a large amount of nuclides in the adjacent new fuel module 4 into fissile nuclides, meanwhile, a large amount of fissile nuclides are consumed due to a fission reaction in the new fuel module, such that the new fuel module degrades into the spent fuel module 2, and the adjacent new fuel module 4 enters nuclear criticality state such that it can be seen that the breeding wave (a large number of fissile materials generated by the nuclear conversion reaction) and the critical wave are sequentially transmitted in the axial direction. In this way, the whole travelling wave reactor may continuously provide fission energy, and provide a space propulsion by means of nuclear thermal conversion or nuclear electric conversion.

Figure 3:
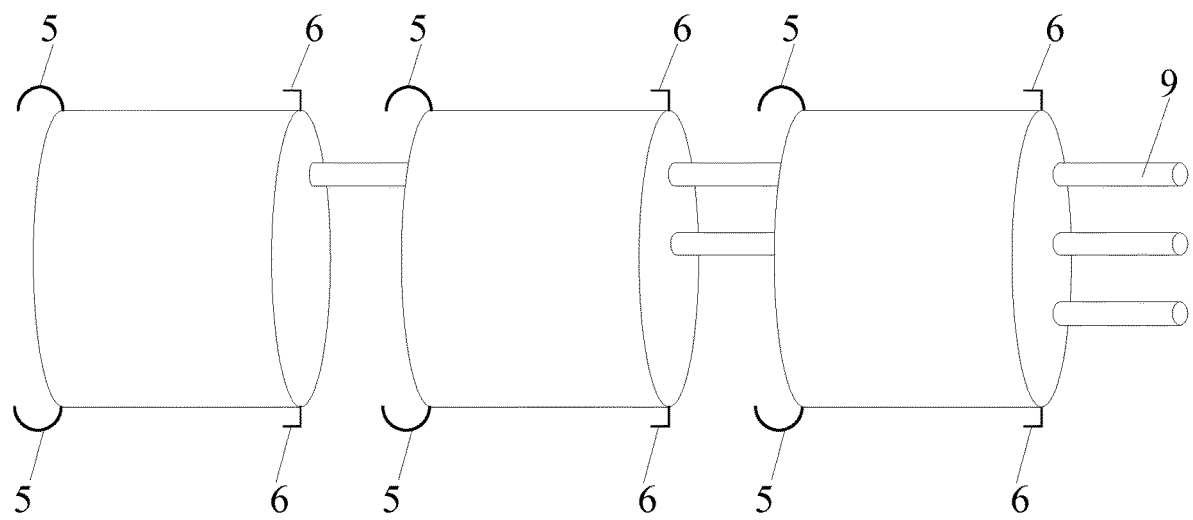
FIG. 3 is a schematic diagram of assembly of all modules of the travelling wave reactor for a space exploration in Embodiment 1.

As shown in FIG. 3, the assembling parts includes a fastening hasp 5 and a fastening bolt 6 which are arranged on edge sides of two end portions of each module, and each two adjacent modules are detachably assembled by means of the fastening hasp 5 and the fastening bolt 6, specifically, the fastening bolt 6 is rotated and buckled into the fastening hasp 5 to tightly combine the two adjacent modules. Meanwhile, during butt joint, the heat pipe 9 also has a positioning function, but as each module needs to have an extraction function, the following design is adopted. As shown in FIG. 3, assembly of three modules is taken as a schematic diagram, one heat pipe 9 extends out of a left module to carry out heat generated thereby, the heat pipe passes through the two modules on a right side and then is inserted into the thermoelectric conversion device, such that one heat pipe 9 extends out of a middle module, and besides, the middle module is provided with a perforation for all the modules 9 (not all shown in the figure) on a left side to pass through, so do the modules on the right side. In this way, when each module is separated from the thermal reactor, the heat pipe 9 thereof is extracted together to realize separation.

When the travelling wave reactor is used as a power source for the space exploration, a specific application mode is as follows:

Firstly, a set number of starting source module 1 and new fuel modules 4 of the travelling wave reactor are launched to a preset position of the space.

Then, the new fuel modules 4 are sequentially and axially connected by means of the assembling parts to form a new fuel module group.

Finally, the starting source module 1 is mounted at a head end of the new fuel module group by means of the assembling parts, and the heat pipe 9 extending out of an end portion is connected to a thermoelectric conversion device, then start the travelling wave reactor to burn, the heat pipe 9 conducts heat generated by the hot reactor, and the heat is converted into electrical energy by means of the thermoelectric conversion device, so as to supply power to a spacecraft.

Figure 4:
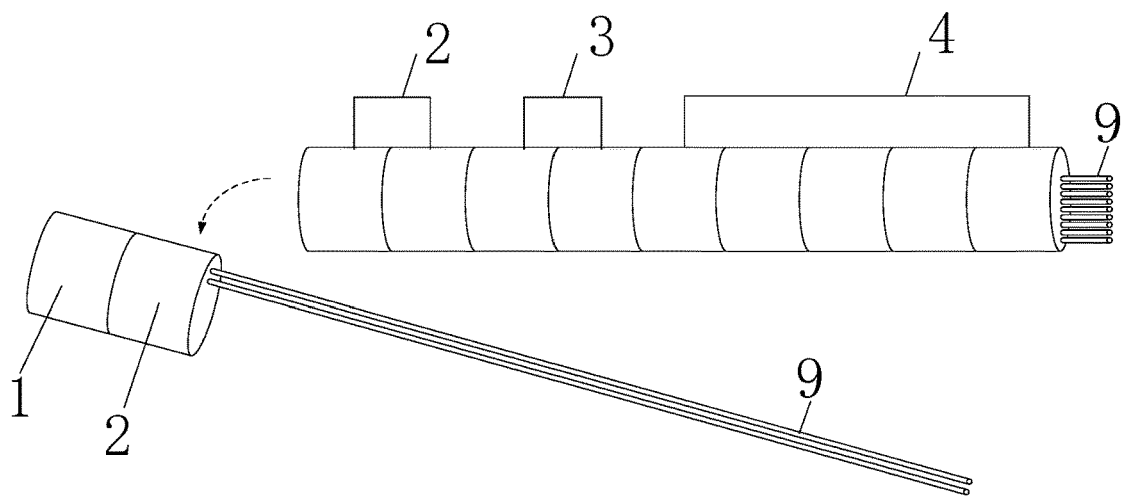
FIG. 4 is a schematic diagram of a structure after part of deadweights are discarded of the travelling wave reactor for a space exploration in Embodiment 1.

When the travelling wave reactor operates, spent fuel is continuously accumulated at a rear portion of the travelling wave direction to form the spent fuel module 2, and on the premise of ensuring a criticality of the reactor core by means of nuclear physics calculation, the starting source module 1 and part of the spent fuel modules 2 are separated from the travelling wave reactor and discarded. As shown in FIG. 4, the starting source module and part of the spent fuel modules are discarded in a travelling wave transmission direction from left to right in sequence. When a certain spent fuel module 2 is to be discarded, the fastening hasp 5 in the module adjacent to the right side of the spent fuel module is also opened, such that the module is automatically separated from a travelling wave reactor body. FIG. 4 shows that during discharging for the first time, the starting source module 1 at the head end and one spent fuel module 2 are discarded, at the same time, the heat pipes 9 on the discarded starting source module 1 and the spent fuel module 2 are also discarded away from the thermal reactor, and as the travelling wave reactor continuously operates, the spent fuel module 2 may be continuously discarded from a left end in the figure.

The travelling wave reactor of the present invention has the following design points:

(1) The reactor core is designed in a building block manner.

With regard to the reactor used for a deep space exploration, operation features of the travelling wave reactor may be utilized to increase or decrease a length of a new fuel interval according to features and lengths of space missions. In this design, a reactor core material in the travelling wave direction is designed in a modularized manner such that a length of the reactor core in the travelling wave transmission direction may be changed as required like building blocks.

(2) The reactor core materials are launched in a modularized manner, and assembled in the space.

In order to meet requirements of critical mass of the reactor and overcome a pressure of an overall launch weight (such as a long-term mission) of the reactor on a single launch mission, the whole reactor core extending in the travelling wave direction (the axial direction) is separated into several modules, then the modules are separately launched to a preset orbit and then are axially connected on a space station or other extraterrestrial bases, and finally, the starting source module 1 is mounted to start the reactor.

(3) Spent fuel may be discarded to provide extra propulsion.

With regard to a specific mission of the space exploration, since after a period of time of operation, spent fuel is continuously accumulated at the rear portion of the travelling wave direction of the travelling wave reactor, on the premise of ensuring the criticality of the reactor core, part of the spent fuel modules may be directly discarded as a "deadweight" such that on one hand, the load of the spacecraft may be reduced, and on the other hand, the one-time propulsion may be obtained during discarding, so as to improve power efficiency of the space exploration.

In this embodiment, the number (10) of the new fuel modules 4 is relatively great at zero burnup, which is suitable for a long-term operation.

Embodiment 2

Figure 5:
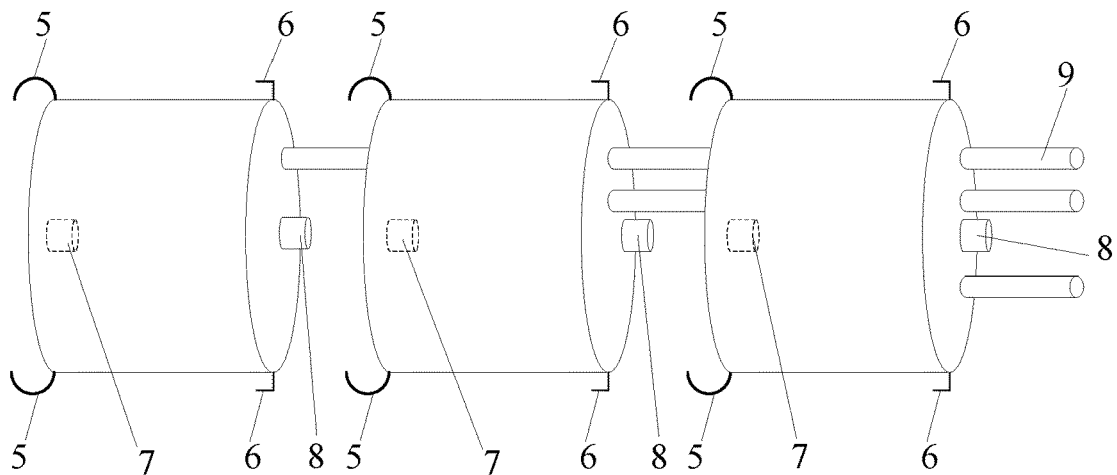
FIG. 5 is a schematic diagram of assembly of all modules of the travelling wave reactor for a space exploration in Embodiment 2.

A structure of the travelling wave reactor for a space exploration in the embodiment is the same as that in Embodiment 1, and a difference is that each module in the travelling wave reactor further includes a butt joint positioning member for coaxial butt joint during assembly. As shown in FIG. 5, the butt joint positioning member includes a bump 7 and a groove 8 which are coaxially arranged at two ends of each module, and during assembly, in addition to the positioning function of the heat pipe 9, the bump 7 and the groove 8 on each two adjacent modules match each other, such that positioning accuracy is higher, and reliability of assembly is improved.

Embodiment 3

Figure 6:
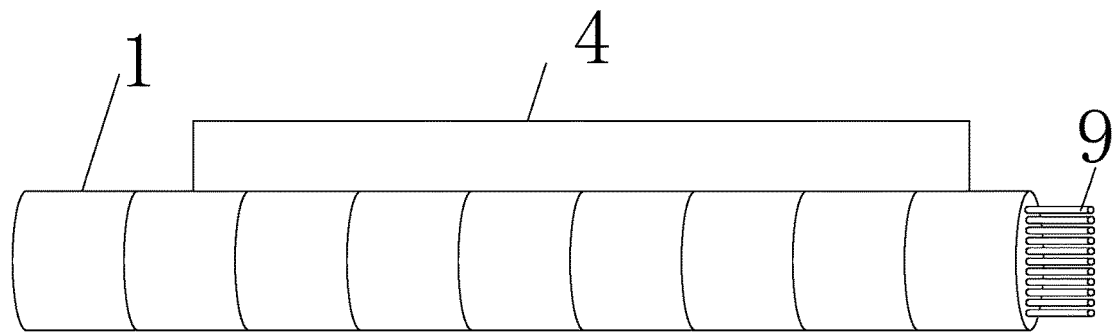
FIG. 6 is a schematic diagram of a structure without burn-up of the travelling wave reactor for a space exploration in Embodiment 3.

FIG. 6 shows a schematic diagram of a short-cycle reactor core structure of the travelling wave reactor for a space exploration in the embodiment. In the core of the travelling wave reactor, one starting source module 1 is arranged, and eight new fuel modules 4 are arranged at zero burnup. The other features are the same as those of Embodiment 1.

Figure 7:
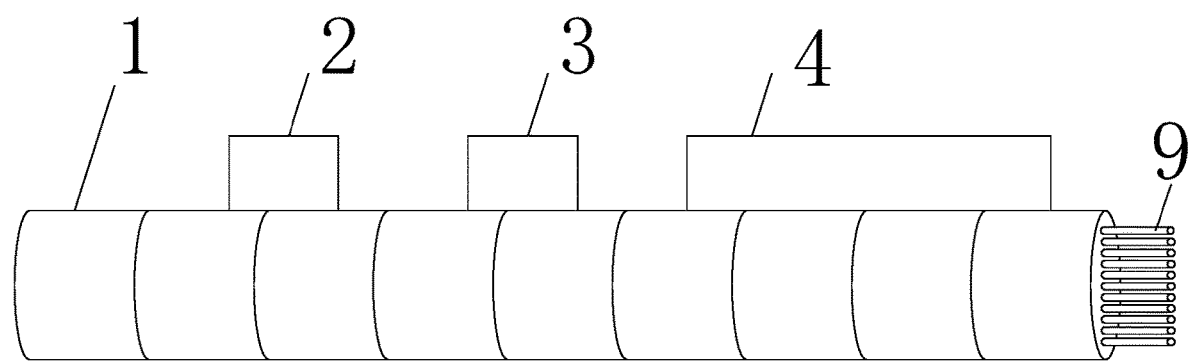
FIG. 7 is a schematic diagram of a structure after a period of time of burn-up of the travelling wave reactor for a space exploration in Embodiment 3.

FIG. 7 is a schematic diagram of a state of the reactor core travelling wave reactor after a period of time of burn-up in the embodiment, two spent fuel modules 2 and two critical fuel modules 3 are arranged, and four new fuel modules 4 are remained. During burning, by discarding part of the spent fuel modules as "deadweights", on the one hand, the load of the spacecraft may be reduced, and on the other hand, the one-time propulsion may be obtained during discarding, so as to improve power efficiency of the space exploration.

The above implementations are merely exemplary, and are not intended to limit the scope of the present invention. These implementations may also be carried out in various other ways, and various omissions, substitutions and changes may be made without departing from the scope of the technical idea of the present invention.

What is claimed is:

1. A traveling wave reactor for a space exploration, wherein a nuclear reactor core of the traveling wave reactor is separated into several modules in a traveling wave direction;
the reactor is sequentially provided with a starting source module and a plurality of new fuel modules at zero burnup;
all the modules are coaxially assembled in the traveling wave direction by assembling parts, and
each module further comprises a heat pipe;
the heat pipe in each module is
positioned at a front part of the module,
extends out of the module at a rear part of the module, and
sequentially passes through all the modules positioned rear of the module;
the starting source module is used for emitting neutron flow to enable at least one of the new fuel modules to reach nuclear criticality, and to continue to form a critical traveling wave;
after a period of time of burn-up, the nuclear reactor core of the traveling wave reactor is provided with the starting source module, a spent fuel module, a critical fuel module and the new fuel modules sequentially in the traveling wave direction; and
the spent fuel module is generated after a first new fuel module of the new fuel modules is subjected to a critical nuclear reaction,
a certain amount of fissile nuclide is generated after the first new fuel module experiences an amount of nuclear conversion reactions, so as to enter a nuclear criticality state,
and in the state, a number of neutrons released by the critical fuel module by nuclear fission reaction exceeds a number of neutrons absorbed by the critical fuel module, so as to promote nuclear conversion in the first new fuel module on one side of the first new fuel module.

2. The traveling wave reactor for a space exploration according to claim 1, wherein the reactor is configured to allow all the modules to be transported from land to the space, and then have the travelling wave reactor assembled in space.

3. The traveling wave reactor for a space exploration according to claim 1, wherein the starting source module comprises a starting source inner layer and a starting source outer layer in a radial direction, the starting source inner layer being provided with a neutron source material, and the starting source outer layer being a neutron shielding layer.

4. The traveling wave reactor for a space exploration according to claim 1, wherein the new fuel module comprises a new fuel inner layer and a new fuel outer layer in a radial direction, the new fuel inner layer being filled with a convertible material, and the new fuel outer layer being a neutron shielding layer.

5. The traveling wave reactor for a space exploration according to claim 1, wherein uniform sections of all the modules in the traveling wave reactor are in butt joint.

6. The traveling wave reactor for a space exploration according to claim 1, wherein the assembling parts comprises a fastening hasp and a fastening bolt which are arranged on edge sides of two end portions of each module, and each two adjacent modules are detachably assembled by the fastening hasp and the fastening bolt.

7. The traveling wave reactor for a space exploration according to claim 1, wherein each module in the traveling wave reactor further comprises a butt joint positioning member for coaxial butt joint during assembly.

8. The traveling wave reactor for a space exploration according to claim 7, wherein the butt joint positioning member comprises a bump and a groove which are coaxially arranged at two ends of each module, and during assembly, the bump and the groove on each two adjacent modules match each other.

9. The traveling wave reactor for a space exploration according to claim 1, wherein the reactor is configured to allow the traveling wave reactor to be used as a power source for the space exploration, and to allow a specific application mode to be followed:
firstly, a set number of starting source module and new fuel modules of the traveling wave reactor are launched to a preset position of the space;
then, the new fuel modules are sequentially and axially connected by the assembling parts to form a new fuel module group; and
finally, the starting source module is mounted at a head end of the new fuel module group by the assembling parts, and
the heat pipe extending out of an end portion is connected to a thermoelectric conversion device,
then start the traveling wave reactor to burn.

10. The traveling wave reactor for a space exploration according to claim 9, wherein when the traveling wave reactor operates, spent fuel is continuously accumulated at a rear portion of the traveling wave direction to form the spent fuel modules, and on the premise of ensuring a criticality of the nuclear reactor core by nuclear physics calculation, the reactor is configured to allow the starting source module and part of the spent fuel modules to be separated from the traveling wave reactor and discarded.

* * * * *